J. PEARCE.

SEED-SOWER.

No. 7,734. Reissued June 12, 1877.

WITNESSES

Robert Everett

George E. Upham

INVENTOR.

Jonathan Pearce.

Gifford, Smith & Co.

ATTORNEYS.

N. PETERS, PHOTO-LITHOGRAPHER, WASHINGTON, D. C.

UNITED STATES PATENT OFFICE.

JONATHAN PEARCE, OF SHELBYVILLE, KENTUCKY.

IMPROVEMENT IN SEED-SOWERS.

Specification forming part of Letters Patent No. 186,214, dated January 16, 1877; reissue No. 7,734, dated June 12, 1877; application filed May 19, 1877.

*To all whom it may concern:*

Be it known that I, JONATHAN PEARCE, of Shelbyville, Shelby county, in the State of Kentucky, have invented certain new and useful Improvements in Seed-Sowers; and I do hereby declare the following to be a full, clear, and exact description thereof, reference being had to the accompanying drawing, and to the letters of reference marked thereon.

My invention relates to machines for sowing seed, and has for its object an increase in the efficiency, convenience, and durability of a class of devices for sowing all classes of small seeds, consisting in the peculiar arrangement of the several devices constituting a machine by means of which seed may be sown regularly, and evenly distributed without choking, by means of centrifugal force produced by rapid motion given to the machine by the operator, which effectually scatters the seed, and thereby saves much time and labor with better results than is possible to be done by hand.

In order to enable others skilled in the art to which my invention appertains to make and use the same, I will now proceed to describe its construction and operation, referring to the annexed drawing, which forms a part of this specification, and in which—

Figure 1:
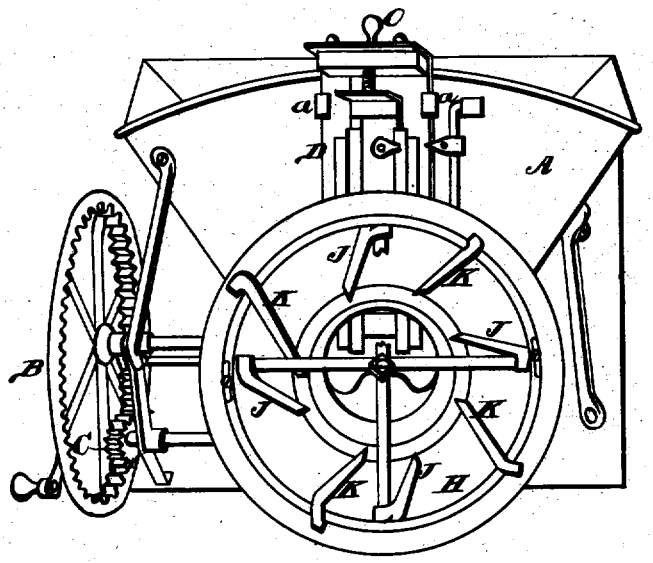
Figure 2:
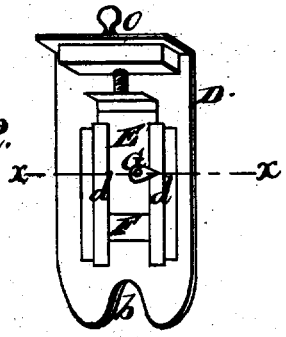
Figure 3:
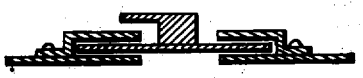

Figure 1 is a perspective view of the machine, showing its general construction. Fig. 2 is a perspective view of the adjustable slide for regulating the quantity of seed to be sown. Fig. 3 is a sectional view of the adjustable slide on the line *x x* of Fig. 2.

A represents the hopper or body of the machine, which is made of sheet metal, and in form as shown in the drawing, with a small sack secured to the top to assist in holding the seed, and also to answer as a means by which it may be suspended from the neck of the operator.

B is the driving-wheel by which the machine is operated, and C is the pinion.

D is an adjustable slide working in guides *a a* on the front of the hopper, for the purpose of regulating the quantity of seed to be sown. This slide is made in form as shown in Fig. 2, with a small aperture, *b*, in its lower end.

Near the lower end of the slide D is another opening, F, of any suitable form and size, and provided with an additional slide, E, working over it in guides *d* attached to the front of the main slide D, in order to open or close the space F to permit the escape of more or less seed, and thereby regulate the quantity required per acre of land. To the auxiliary slide E is attached an index hand or finger, G, to point at suitable graduations on one of the guides *d* for setting the slide E at a given point when the quantity of seed is determined. The slide E is operated by the fingers and thumb, having a thumb-screw, O, as a stop, as shown, so that it can be adjusted to a nicety by simply turning said screw to the right or left.

H is a bowl-shaped ring or mouth-piece, made of metal, with a narrow flange turned on the inside of the bottom and outside of the top, and is secured to a four-armed spider on the end of the shaft, by which the machine is driven so as to work nearly close against the hopper. This bowl-shaped mouth-piece H is provided with stationary ribs J and adjustable ribs K on the inside, to assist in effectually distributing the seed as it leaves the mouth of the machine. The adjustable ribs K are more especially intended to equalize the seed sown on either side of the operator, and are so arranged as to be easily adjusted or set at any required angle to suit the natural speed the operator would turn the machine and to make an even distribution of the seed. The ribs K can be secured in that position by means of set-screws through slot-openings in the flange of the mouth-piece.

These adjustable ribs K may be arranged in various other ways. For instance, they may be hinged on the inside of the mouth-piece near the top, and operated by means of a ring around the bowl or mouth-piece near the bottom, connecting with the ribs by means of set-screws through slot-openings in the mouth-piece, or in any other suitable manner most convenient.

What I claim as new, and desire to secure by Letters Patent, is—

1. In a centrifugal seed-sower, a series of adjustable ribs arranged within the mouth-piece, for the purposes herein set forth.

2. In a centrifugal seed-sower, a series of stationary ribs, and a series of adjustable ribs, both series arranged within the mouth-piece, for the purposes set forth.

3. The combination of the main slide D, having apertures *b* and F, and guides *d d*, the auxiliary slide E, provided with the index-finger G, and the adjusting-screw O, all constructed and arranged in guides *a* on the hopper A of a seed-sower, substantially as and for the purposes herein set forth.

In testimony that I claim the above I have hereunto subscribed my name in the presence of two witnesses.

JONATHAN PEARCE.

Attest:
W. T. BASKETT,
S. A. BASKETT.